US005442010A

United States Patent [19]
Hauenstein et al.

[11] Patent Number: 5,442,010
[45] Date of Patent: Aug. 15, 1995

[54] EPOXY-TERMINATED POLYISOBUTYLENE-POLYDIMETHYL-SILOXANE COMPOSITIONS

[75] Inventors: Dale E. Hauenstein; Thomas M. Gentle; Linda D. Kennan, all of Midland; Paul J. Popa, Auburn, all of Mich.

[73] Assignee: Dow Corning Corporation, Midland, Mich.

[21] Appl. No.: 317,447

[22] Filed: Oct. 4, 1994

[51] Int. Cl.$^6$ .................................................. C08K 3/36
[52] U.S. Cl. ........................................ 524/588; 528/27; 524/790; 524/789; 524/860; 524/868; 525/474; 525/476; 252/321; 252/358
[58] Field of Search .................. 528/27; 524/588, 790, 524/789, 860, 868; 525/474, 476; 252/321, 358

[56] References Cited

U.S. PATENT DOCUMENTS

| | | | |
|---|---|---|---|
| 2,356,367 | 8/1944 | Wright | 252/29 |
| 2,375,007 | 5/1945 | Larsen | 252/48 |
| 2,398,187 | 4/1946 | McGregor | 252/78 |
| 2,466,642 | 4/1949 | Larsen | 252/29 |
| 2,773,034 | 12/1956 | Bartleson | 252/32.7 |
| 3,328,482 | 6/1967 | Northrup et al. | 260/825 |
| 3,697,440 | 10/1972 | Lichtman | 252/321 |
| 3,816,313 | 6/1974 | Szieleit | 252/49.6 |
| 3,959,175 | 5/1976 | Smith, Jr. et al. | 252/321 |
| 4,514,319 | 4/1985 | Kulkarni | 252/321 |
| 5,262,468 | 11/1993 | Chen | 524/476 |

FOREIGN PATENT DOCUMENTS 529161 9/1993 European Pat. Off. .
63-199277 8/1988 Japan .
1490240 10/1977 United Kingdom .

OTHER PUBLICATIONS

The Miscibility of Polymers: I. Phase Equilibria in Systems Containing Two Polymers and a Mutual Solvent, by Allen, Gee and Nicholson, (1959), pp. 56–62.
The Miscibility of Polymers: II. Miscibility and Heat of Mixing of Liquid Polyisobutenes and Silicones, by Allen, Gee and Nicholson, (1960). pp. 8–17.
Synthetic Lubricants and High–Performance Functional Fluids, Marcel Dekker, Inc., (1993) p. 279.
The Panalane Advantage, Amoco, (1992), pp. 2–8.
Macromolecules, vol. 8, No. 3, May–Jun. 1975, pp. 371–373.

*Primary Examiner*—John C. Bleutge
*Assistant Examiner*—Margaret W. Glass
*Attorney, Agent, or Firm*—Alexander Weitz

[57] ABSTRACT

A composition is disclosed, said composition comprising
(A) a polydimethylsiloxane having a viscosity greater than about 2 cS at 25° C.; and
(B) a polyisobutylene oligomer having a number average molecular weight of about 200 to about 3,000 and having at least one end terminated with an epoxy-containing group, the weight ratio of said polydimethylsiloxane (A) to said polyisobutylene (B) being in the range 1:99 to 99:1.

21 Claims, No Drawings

EPOXY-TERMINATED POLYISOBUTYLENE-POLYDIMETHYLSILOXANE COMPOSITIONS

FIELD OF THE INVENTION

The present invention relates to an antifoaming composition. More particularly, the invention relates to a composition comprising a blend of a polydimethylsiloxane oil and a polyisobutylene oligomer having at least one end terminated with an epoxy-containing group.

BACKGROUND OF THE INVENTION

Polydimethylsiloxane oils, particularly when formulated with a silica powder, are known for their ability to reduce frothing or foaming in aqueous systems. There are also examples in the art where organic formulations have been used to control foam in such systems. Such antifoaming or defoaming agents find utility in many industrial processes, some of which would be highly impractical were the agent not available.

Antifoam agents containing both organic and silicone components are also known in the art. For example, U.S. Pat. No. 3,959,175 to Smith et al. discloses a defoamer based on a mixture of polyisobutylene and a high melting hydrophobic component, such as fatty amide, fatty acid or tri-glyceride, or a mixture of the polyisobutylene and a hydrophobic material such as treated silica powder. Combination of the above three ingredients is also taught by Smith et al. This prior art patent incorrectly includes silicone oil as a member of the aforementioned "high melting" component which is said to have a melt point above 40° C. (the typical melting point of a polydimethylsiloxane oil is actually about −40° C.). This patent illustrates the invention with examples wherein silicone oil is used, albeit at levels of no more than 0.5 percent. The viscosity of the silicone oil used is not stated and no criticality thereof is suggested by Smith et al. Likewise, the polyisobutylene taught is shown to have particular end groups of the formula $-CH_2C(CH_3)=CH_2$, and there is no suggestion to alter this group.

SUMMARY OF THE INVENTION

The present inventors have now discovered that certain blends of polydimethylsiloxane (PDMS) oils and polyisobutylene (also referred to as polybutene or PIB herein) have antifoaming activity which is superior to either of these individual components. Blends wherein the polyisobutylene has at least one terminal epoxy-containing group in its molecule have been found to be significantly better antifoams for aqueous detergent foaming systems than comparable blends wherein both terminal groups are saturated hydrocarbon groups, such as those having the structure $-C(CH_3)_3$ or $-CH_2CH(CH_3)_2$. The latter structure is almost identical with that of the end group taught by Smith et al., cited supra. It is considered quite surprising that such a subtle change in the end groups can result in the improved defoaming performance of the blends wherein the polyisobutylene has an epoxy-containing end group.

The synergistic antifoam activity observed when the instant blends are used to defoam an aqueous foaming system may be further augmented by the incorporation of a fine silica powder. This further serves to reduce the concentration of antifoam agent required to defoam a particular foaming system.

The present invention therefore relates to an antifoam composition comprising:
(A) a polydimethylsiloxane having a viscosity greater than about 2 cS at 25° C.; and
(B) a polyisobutylene oligomer having a number average molecular weight of about 200 to about 3,000 and having at least one end terminated with an epoxy-containing group, the weight ratio of said polydimethylsiloxane (A) to said polyisobutylene (B) being in the range 1:99 to 99:1.

The invention further relates to a method for defoaming a foaming system using the above composition.

DETAILED DESCRIPTION OF THE INVENTION

The polydimethylsiloxane (A) of the invention is a homopolymer or copolymer having a viscosity at 25° C. which is greater than about 2 cS wherein up to about 15 mole percent of diorganosiloxane units may be copolymerized with the dimethylsiloxane units. It has been found that when the viscosity of the polydimethylsiloxane is $\leq 2$ cS the antifoam activity of the instant blends is not improved over the corresponding polydimethylsiloxane polymer itself. On the other hand, when the viscosity of this component is more than about 2 cS, a synergistic effect is obtained wherein the antifoaming activity of the composition is superior to either the pure polydimethylsiloxane or the pure PIB components. There is no critical upper limit of the polydimethylsiloxane viscosity and it is only limited by practical mixing considerations, but is preferably no more than about 100,000 cS.

The organic groups of the above mentioned diorganopolysiloxane units are independently selected from alkyl radicals having 1 to 16 carbon atoms, phenyl radical or halogenated alkyl radicals having 3 to 6 carbon atoms or alkylene oxide groups, such as ethylene oxide, propylene oxide or copolymeric combinations thereof.

The nature of the terminal groups on the polydimethylsiloxane component (A) is not critical for the purposes of the present invention and these are preferably inert groups, such as trimethylsiloxy, dimethylphenylsiloxy and diethylphenylsiloxy. They may also be illustrated by groups such as dimethylvinylsiloxy, dimethylhexenylsiloxy, dimethylhydroxysiloxy, dimethylhydrogensiloxy, dimethylalkoxysiloxy, methyldialkoxysiloxy and trialkoxysiloxy, wherein the alkoxy groups are preferably methoxy. Most preferably, component (A) is a polydimethylsiloxane homopolymer having trimethylsiloxy terminal units.

Component (A) is well known in the art and is generally available commercially.

Component (B) of the invention is a polyisobutylene oligomer having a number average molecular weight (MW) of about 200 to about 3,000, preferably about 200 to about 800 and most preferably about 300 to about 400. For the purposes of the present invention, the polyisobutylene oligomer must have at least one terminal group in its molecule which contains an epoxy group. This epoxy group has the general structure

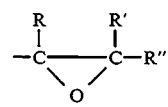

in which R, R' and R" independently represent organic radicals selected from the group consisting of hydrogen and alkyl radicals having 1 to 7 carbon atoms. Such oligomers are known in the art and many are available commercially in a variety of molecular weights from the Amoco Chemical Company (Chicago, Ill.) under the trade name Actipol ™.

For the purposes of the present invention, the weight ratio of component (A) to component (B) is such that the antifoam activity of the blend of (A) and (B) is greater than that of either (A) or (B) alone, as determined by the percent foam drop in a simple shake test, described infra. Generally, this ratio is about 1:99 to about 99:1. Preferably, this ratio is about 95:5 to about 5:95, more preferably about 90:10 to about 10:90 and most preferably about 90:10 to about 70:30.

In addition to components (A) and (B), the instant compositions preferably also contain (C), a fine powdered silica component. The addition of silica further augments the antifoam activity of the instant compositions. Component (C) can be a precipitated or fumed silica which is treated with, e.g., a silane or siloxane agent to render it hydrophobic, as commonly practiced in the art. Examples of such treating agents include hexamethyldisiloxane, trimethylchlorosilane and low molecular weight silanol-terminated polydimethylsiloxane, preferably hexamthyldisilazane. Preferably, this component is a silica having a surface area in the range of 50 to 400 $m^2$/gram, most preferably 50 to 150 $m^2$/gram. The silica can be pre-treated or treated in-situ.

In order to prepare the instant antifoam compositions, components (A), (B) and, optionally, component (C) are blended to form a homogeneous mixture. Any suitable means for mixing such systems may be used (e.g., low shear mixers, vortex mixer) and the order of addition is not critical. Typically, components (A) and (B) are added to component (C) and the latter is then uniformly dispersed in components (A) and (B).

In the method of the present invention, the above described composition is added to a foaming system, preferably an aqueous foaming system, in an amount sufficient to reduce foaming, as determined by routine experimentation. Typically, the amount of the antifoam composition used in such a foaming system is approximately 1 to 14,000 parts per million (ppm) based on the weight of the foaming system. Preferably, this range is about 1 to about 8,000 ppm, most preferably about 200 to about 4,000 ppm.

When silica (C) is employed in the instant method, it is preferably present at a level which results in a silica concentration of no more than about 140 ppm (by weight), preferably no more than about 40 ppm, in the foaming system. Preferably, up to about 50%, more preferably up to about 35% and most preferably up to about 3%, of the silica is present based on the total weight of components (A), (B) and (C). It has been found that addition of greater amounts of silica in the preferred aqueous foaming systems does not improve the efficiency of the antifoam composition beyond that of only polydimethylsiloxanesilica mixtures. Thus, for example, when the total antifoam concentration of the antifoam composition is more than about 4,000 ppm, the silica content is preferably no more than about 3% based on the combined weight of components (A) and (B) and (C). For the above recited preferred range of antifoam concentration in a foaming system, the silica is preferably used at a level of up to 1 percent based on the total weight of (A), (B) and (C). The skilled artisan will readily determine the optimum amount of silica by routine experimentation.

In a preferred embodiment of this method, the foaming system comprises aqueous surfactant media, such as aqueous detergents encountered in laundry and dishwashing applications. The compositions are also suitable as antifoams in pulp and paper production. Additionally, the instant method may be used to defoam other foaming systems, such as found in petroleum and petrochemical processing, solvent-based inks and paints and in chemical processing.

EXAMPLES

The following examples are presented to further illustrate the composition and method of this invention, but are not to be construed as limiting the invention, which is delineated in the appended claims. All parts and percentages in the examples are on a weight basis and all measurements were obtained at a temperature of 25° C., unless indicated to the contrary.

The activity of antifoam compositions, described infra, were determined by a shake test as follows. An aqueous detergent stock solution was prepared by adding 20 drops (0.45 gram) of DAWN ™ Original Scent dishwashing liquid (Proctor & Gamble, Cincinnati, Ohio) to 345 ml of warm tap water and mixing thoroughly. Twenty ml (19.7 g) aliquots of the above stock solution were placed into 9.5 dram vials, filling each vial about half way. An antifoam composition was added to each vial at the level indicated in the tables below. In each shake test series at least one vial did not contain antifoam agent and this served as a control for the series. In the shake test procedure a vial was lifted to a position above the operator's ear and then shaken by extending the arm in a "throwing" motion (approximately a 2 foot extension), then returning to the initial position. Ten such shake cycles were used in each case, with a slight pause between cycles, all within a span of 5 seconds. After shaking, the vial was placed on a laboratory bench top and observed as a function of time, as shown in the tables below.

The activity of a given antifoam composition after a given time interval was obtained according to the following formula: % drop in foam height = 100 (T−F)(T−L)

wherein T=8.4 cm=maximum height of liquid plus foam in the vial (i.e., when empty portion of vial is completely filled with foam)
F=liquid plus foam height at a given time
L=liquid height=4.4 cm From the above formula it is seen that, when foam fills the empty portion of the vial, as in the case of the controls immediately after shaking, T=F and the % drop is zero. Likewise, when all the foam has collapsed after a given time interval, F=L and the % drop is 100%. Thus, a larger value of the % drop (for a given time of rest after shaking) indicates improved defoaming activity. The values of F obtained herein represent an average of three measurements, each at a different location around the vial.

Series 1

Polysynlane ™ PIB and trimethylsiloxy-terminated PDMS having a viscosity of 350 cS (350 $mm^2$/sec) were blended in the ratios shown in the first column of Table 1a to form comparative antifoam agents and these were evaluated according to the above shake test. Polysynlane ™ is described as a saturated polyisobutylene having a number average molecular weight of about 320 (MW=380 by gel permeation chromatography) and having a terminal group of the formula

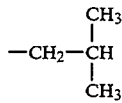

the other terminal group being of the formula —C(CH3)3. It is a product of Polyesther Corporation, Southhampton, N.Y. The measured total concentration of the antifoam blend (or pure PIB or PDMS) in the foaming system is shown in the second column of Table 1a (ppm=parts per million). The % drop in foam height at three different times is reported in the last three columns. For the purposes herein, the term "immediate" indicates measurement within 10 seconds.

TABLE 1a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 25 |
| 100/0 | 4023 | 22 | 27 | 60 |
| 0/100 | 4162 | 0 | 0 | 33 |
| 90/10 | 4112 | 21 | 22 | 51 |
| 70/30 | 4114 | 14 | 14 | 50 |
| 50/50 | 4132 | 22 | 23 | 49 |
| 30/70 | 4208 | 19 | 19 | 51 |
| 10/90 | 4036 | 14 | 15 | 58 |

From Table 1a it is seen that the antifoam activity of these blends is generally lower than that of the pure PDMS component (i.e., weight ratio=100/0) for all times.

This series also included evaluation of the above compositions wherein 3% of each blend was replaced with QUSO ™ WR55 FG silica powder. QUSO ™ WR55 FG is described as a synthetic, amorphous, precipitated silica which is treated with polydimethylsiloxane, has a typical surface area of 90 m²/g and is marketed by Degussa Corporation, Dublin, Ohio. The results are presented in Table 1b.

TABLE 1b (3% silica in antifoam composition)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 25 |
| 100/0 | 4061 | 97 | 98 | 100 |
| 0/100 | 4086 | 38 | 40 | 100 |
| 90/10 | 4079 | 95 | 97 | 100 |
| 70/30 | 4135 | 95 | 97 | 100 |
| 50/50 | 4081 | 95 | 95 | 100 |
| 30/70 | 4137 | 95 | 95 | 100 |
| 10/90 | 4059 | 93 | 93 | 100 |

From Table 1b it is again seen that the antifoam activity of these blends is generally lower than that of the pure PDMS component. In this case, however, the introduction of silica results in good performance for most of the compositions.

Series 2

The comparative evaluations using the Polysynlane ™ PIB and PDMS of Series 1 were repeated wherein the total concentration of the antifoam blend was reduced, as indicated in Tables 2a and 2b.

TABLE 2a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 26 |
| 100/0 | 736 | 23 | 28 | 57 |
| 0/100 | 822 | 0 | 0 | 8 |
| 90/10 | 736 | 0 | 0 | 39 |
| 70/30 | 756 | 11 | 13 | 49 |
| 50/50 | 731 | 0 | 0 | 25 |
| 30/70 | 761 | 4 | 7 | 44 |
| 10/90 | 741 | 0 | 0 | 29 |

TABLE 2b (3% silica in antifoam agent)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 26 |
| 100/0 | 726 | 84 | 86 | 100 |
| 0/100 | 777 | 11 | 16 | 100 |
| 90/10 | 716 | 67 | 70 | 100 |
| 70/30 | 761 | 85 | 86 | 100 |
| 50/50 | 746 | 75 | 78 | 100 |
| 30/70 | 771 | 79 | 81 | 100 |
| 10/90 | 746 | 76 | 78 | 100 |

From Tables 2a and 2b it is seen that the same general trend as found in Series 1 was obtained at the lower antifoam concentrations (i.e., the addition of this PIB to PDMS generally detracts from the antifoam performance of the latter for all time intervals under consideration).

Series 3

Antifoam agents of the present invention were prepared as described in Series 1 using Actipol ™ E-6 PIB in place of the Polysynlane ™. Actipol ™ E-6 is described as an epoxy-terminated polyisobutylene having a number average molecular weight of about 365 and is a product of the Amoco Chemical Company, Chicago, Ill. One terminal group of this oligomer has the structure

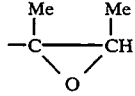

in which Me denotes a methyl radical, the other end group being of the formula —C(CH3)3.

The results of the shake test using antifoam concentrations similar to those of Series 2 are presented in Tables 3a and 3b.

TABLE 3a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 13 |
| 100/0 | 695 | 19 | 21 | 44 |
| 0/100 | 706 | 8 | 18 | 56 |
| 90/10 | 690 | 30 | 34 | 82 |
| 70/30 | 690 | 21 | 26 | 83 |
| 50/50 | 670 | 7 | 7 | 93 |
| 30/70 | 680 | 16 | 18 | 88 |

TABLE 3a-continued (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 10/90 | 675 | 12 | 13 | 84 |

TABLE 3b (with 3% silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 13 |
| 100/0 | 700 | 75 | 78 | 100 |
| 0/100 | 670 | 68 | 70 | 100 |
| 90/10 | 711 | 95 | 98 | 100 |
| 70/30 | 685 | 93 | 93 | 100 |
| 50/50 | 670 | 90 | 91 | 100 |
| 30/70 | 710 | 90 | 93 | 100 |
| 10/90 | 716 | 88 | 89 | 100 |

Table 3a demonstrates that compositions of the invention have greater antifoam activity than the pure PDMS. This improvement is observed either immediately, or at longer time intervals. As seen from Table 3b, the improvement is even more pronounced when silica is incorporated in the antifoam formulation.

Series 4

Antifoam compositions of the invention based on the PDMS and PIB used in Series 3, above, were evaluated at a higher total concentration, the results being presented in Table 4.

TABLE 4

(no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 0 |
| 100/0 | 4457 | 16 | 16 | 48 |
| 0/100 | 4166 | 10 | 13 | 43 |
| 99/1 | 4469 | 31 | 32 | 55 |
| 90/10 | 4340 | 45 | 53 | 86 |
| 70/30 | 4433 | 48 | 48 | 85 |
| 50/50 | 4296 | 18 | 22 | 76 |
| 30/70 | 4340 | 29 | 32 | 87 |
| 10/90 | 4419 | 20 | 23 | 90 |
| 1/99 | 4320 | 24 | 28 | 89 |

From Table 4 it is again seen that the antifoam activity of the blends is generally improved, either immediately or after longer periods.

Series 5

The effect of the viscosity of trimethylsiloxy-terminated PDMS component on the antifoam performance was determined using the PIB of Series 3, this PDMS viscosity being indicated in the second column of Table 5. In this series of experiments the total antifoam agent concentration was in the range of 4096 to 4455 ppm.

TABLE 5

(no silica)

| Weight Ratio of PDMS/PIB | Viscosity of PDMS (cS) | Drop in Foam Height (%) | | |
|---|---|---|---|---|
| | | Immediate | 5 Minute | 24 Hours |
| 0/0 (Control) | — | 0 | 0 | 0 |
| 100/0 | 2 | 24 | 28 | 59 |
| 90/10 | 2 | 27 | 30 | 46 |
| 100/0 | 350 | 16 | 18 | 45 |
| 90/10 | 350 | 40 | 43 | 76 |
| 100/0 | 1000 | 42 | 43 | 72 |
| 90/10 | 1000 | 58 | 61 | 93 |
| 100/0 | 30000 | 37 | 38 | 70 |
| 90/10 | 30000 | 42 | 46 | 98 |

From Table 5 it is seen that the antifoam activity of blends based on PDMS having a viscosity of 2 cS is not improved by the addition of the epoxy-terminated PIB of the invention whereas blends containing PDMS oil having a viscosity of $\geq 350$ cS show improved performance relative to the corresponding pure PDMS component.

Series 6

Antifoam performance of compositions based on the PDMS and PIB used in Series 3 were evaluated as a function of total concentration in the foaming system, the results being presented in Table 6.

TABLE 6

(no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 28 |
| 100/0 | 573 | 17 | 24 | 55 |
| 100/0 | 1909 | 20 | 23 | 58 |
| 100/0 | 4671 | 26 | 32 | 51 |
| 100/0 | 6825 | 23 | 28 | 68 |
| 100/0 | 13953 | 37 | 43 | 74 |
| 90/10 | 602 | 46 | 50 | 84 |
| 90/10 | 1890 | 41 | 46 | 76 |
| 90/10 | 4957 | 51 | 54 | 85 |
| 90/10 | 7265 | 53 | 60 | 79 |
| 90/10 | 14050 | 54 | 58 | 82 |

From Table 6 it is seen that, within the range of about 600 to 14,000 ppm, the antifoam activity is relatively insensitive to total antifoam concentration.

Series 7

Antifoam compositions based on the PDMS, PIB and silica used in Series 3 were evaluated as a function of silica concentration. The weight ratio of PDMS/PIB is given in the first column of Table 7 and the silica content is shown in ppm based on the total antifoam system and as a percent of the total antifoam agent (i.e., % silica in the combination of polydimethylsiloxane, PIB and silica). The total antifoam concentration in this series was about 188 ppm for the samples containing 1.9 ppm silica and about 4,200 for the remaining samples.

TABLE 7

| Weight Ratio of PDMS/PIB | Immediate Drop in Foam Height (%) at Given Silica Concentration | | | | |
|---|---|---|---|---|---|
| | 1.9 ppm 1% | 4.2 0.1% | 21 0.5% | 42 1% | 136 3% |
| 100/0 | 55 | 50 | 80 | 90 | 95 |
| 0/100 | 29 | 35 | 46 | 65 | 78 |
| 90/10 | 82 | 80 | 93 | 97 | 97 |
| 70/30 | 78 | 83 | 93 | 97 | 97 |
| 50/50 | 65 | 73 | 93 | 95 | 97 |

TABLE 7-continued

| Weight Ratio of PDMS/PIB | Immediate Drop in Foam Height (%) at Given Silica Concentration | | | | |
|---|---|---|---|---|---|
| | 1.9 ppm 1% | 4.2 0.1% | 21 0.5% | 42 1% | 136 3% |
| 30/70 | 65 | 69 | 88 | 93 | 97 |
| 10/90 | 61 | 70 | 85 | 94 | 97 |

Table 7 demonstrates that the activity of the instant compositions is not improved much when the silica content is more than about 140 ppm (3%).

Series 8

The effect of the viscosity of trimethylsiloxy-terminated PDMS component on the antifoam performance was again determined using the PIB of Series 3, this PDMS viscosity being indicated in the second column of Table 8a. In this series of experiments the total antifoam agent concentration was in the range 4112 to 4162 ppm.

TABLE 8a

| | (no silica) | | | |
|---|---|---|---|---|
| Weight Ratio of PDMS/PIB | Viscosity of PDMS (cS) | Drop in Foam Height (%) | | |
| | | Immediate | 4 Hours | 24 Hours |
| 0/0 (Control) | — | 0 | 0 | 29 |
| 0/100 | — | 16 | 29 | 47 |
| 100/0 | 2 | 28 | 39 | 58 |
| 90/10 | 2 | 28 | 40 | 60 |
| 100/0 | 50 | 13 | 21 | 38 |
| 90/10 | 50 | 28 | 41 | 63 |
| 100/0 | 100 | 16 | 28 | 47 |
| 90/10 | 100 | 15 | 35 | 62 |
| 100/0 | 350 | 30 | 45 | 63 |
| 90/10 | 350 | 61 | 73 | 94 |

From Table 8a it is again seen that the antifoam activity of blends based on PDMS having a viscosity of 2 cS is not improved by the addition of the epoxy-terminated PIB of the invention whereas blends containing PDMS oil having a viscosity of greater than 2 cS show improved performance relative to the corresponding pure PDMS component, either immediately or after longer periods.

The above results were repeated using compositions containing 0.5% of the above described silica and the results of testing at a total antifoam agent concentration of 4091 to 4211 ppm are shown in Table 8b.

TABLE 8b

| | (0.5% silica) | | | |
|---|---|---|---|---|
| Weight Ratio of PDMS/PIB | Viscosity of PDMS (cS) | Drop in Foam Height (%) | | |
| | | Immediate | 4 Hours | 24 Hours |
| 0/0 (Control) | — | 0 | 0 | 29 |
| 0/100 | — | 48 | 99 | 100 |
| 100/0 | 2 | 78 | 100 | 100 |
| 90/10 | 2 | 75 | 100 | 100 |
| 100/0 | 50 | 82 | 98 | 100 |
| 90/10 | 50 | 93 | 100 | 100 |
| 100/0 | 100 | 77 | 96 | 100 |
| 90/10 | 100 | 95 | 100 | 100 |
| 100/0 | 350 | 83 | 98 | 100 |
| 90/10 | 350 | 95 | 100 | 100 |

It is again seen that the improved antifoam activity is only obtained when the viscosity of the polydimethylsiloxane is greater than 2 cS.

We claim:

1. A composition comprising:
   (A) a polydimethylsiloxane having a viscosity greater than about 2 cS at 25° C.; and
   (B) a polyisobutylene oligomer having a number average molecular weight of about 200 to about 3,000 and having at least one end terminated with an epoxy-containing group, the weight ratio of said polydimethylsiloxane (A) to said polyisobutylene (B) being in the range 1:99 to 99:1.

2. The composition according to claim 1, wherein said polydimethylsiloxane (A) is a homopolymer.

3. The composition according to claim 2, wherein the molecular weight of said polyisobutylene (B) is 200 to 800.

4. The composition according to claim 3, wherein said polydimethylsiloxane (A) has trimethylsiloxy terminal groups and has a viscosity of $\geq 50$ cS at 25° C.

5. The composition according to claim 1, wherein the molecular weight of said polyisobutylene (B) is 300 to 400.

6. The composition according to claim 1, further comprising up to 50 percent of a silica powder based on the combined weight of said polydimethylsiloxane, said polyisobutylene and said silica powder.

7. The composition according to claim 6, wherein said polydimethylsiloxane (A) is a homopolymer.

8. The composition according to claim 7, wherein the molecular weight of said polyisobutylene (B) is 200 to 800.

9. The composition according to claim 8, wherein said polydimethylsiloxane (A) has trimethylsiloxy terminal groups and has a viscosity of $\geq 50$ cS at 25° C.

10. The composition according to claim 7, wherein said silica is a precipitated silica.

11. The composition according to claim 10, wherein up to 3 percent of said silica powder is present based on the combined weight of said polydimethylsiloxane, said polyisobutylene and said silica powder.

12. The composition according to claim 1, wherein the weight ratio of said components (A) to (B) is in the range of 90:10 to 70:30.

13. The composition according to claim 3, wherein the ratio of said components (A) to (B) is in the range of 90:10 to 70:30.

14. The composition according to claim 6, wherein the ratio of said components (A) to (B) is in the range of 90:10 to 70:30.

15. The composition according to claim 6, wherein the molecular weight of said polyisobutylene (B) is 300 to 400.

16. A method for defoaming an aqueous foaming system comprising adding to said foaming system the composition of claim 1.

17. A method for defoaming an aqueous foaming system comprising adding to said foaming system the composition of claim 3.

18. A method for defoaming an aqueous foaming system comprising adding to said foaming system the composition of claim 4.

19. A method for defoaming an aqueous foaming system comprising adding to said foaming system the composition of claim 6.

20. A method for defoaming an aqueous foaming system comprising adding to said foaming system the composition of claim 8.

21. A method for defoaming a foaming system comprising adding to said foaming system the composition of claim 1.

* * * * *